United States Patent Office 3,083,141
Patented Mar. 26, 1963

3,083,141
3-(N-PYRROLIDINYL)-DERIVATIVES OF 4-HYDROXY-17α-METHYL TESTOSTERONE
Bruno Camerino, Roberto Sciaky, and Giovanni Sala, all of Milan, Italy, assignors to Società Farmaceutici Italia, Milan, Italy, a corporation of Italy
No Drawing. Filed Oct. 16, 1961, Ser. No. 145,490
Claims priority, application Italy Oct. 20, 1960
6 Claims. (Cl. 167—74)

Our invention relates to steroids useful in therapy: the 3-(N-pyrrolidinyl)-derivatives of 4-hydroxy-17α-methyl-testosterone, of 4-hydroxy-17α-methyl-19-nor-testosterone and of 17α-methyl-19-nor-testosterone and a process of preparing them.

The steroids of our invention have the following formulas:

(I)
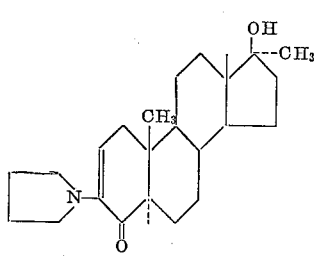

17α-methyl-2-androstene-3-(N-pyrrolidinyl)-17β-ol-4-one (II)
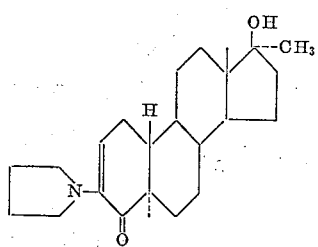

17α-methyl-19-nor-2-androstene-3-(N-pyrrolidinyl)-17β-ol-4-one and (III)
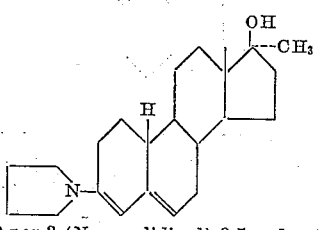

17α-methyl-19-nor-3-(N-pyrrolidinyl)-3,5-androstadiene-17β-ol

The anabolic activity of the 3-(N-pyrrolidinyl) derivatives of 4-hydroxy-steroids of the invention is considerably greater than the activity of the corresponding 4-hydroxy-17α-methyl-steroid as is shown in the following table:

TABLE

| Steroid | Relative therapeutic index |
|---|---|
| 17α-methyl-testosterone | 1 |
| 4-hydroxy-17α-methyl-testosterone | 5.14 |
| 17α-methyl-2-androstene-3-(N-pyrrolidinyl)-17β-ol-4-one (I) | 11.17 |
| 4-hydroxy-17α-methyl-19-nor-testosterone | 3.46 |
| 17α-methyl-19-nor-2-androstene-3-(N-pyrrolidinyl)-17β-ol-4-one (II) | 5.42 |
| 17α-methyl-19-nor-testosterone | 3.17 |
| 17α-methyl-19-nor-3-(N-pyrrolidinyl)-3,5-androstadiene-17β-ol (III) | 4.70 |

The therapeutic index (T.I.) is the ratio:

$$T.I. = \frac{\text{Weight "levator ani" treated rat minus weight "levator ani" control rat}}{\text{Weight prostate treated rat minus weight prostate control rat}}$$

The increase in weight of the "levator ani" muscle is taken as an expression of the anabolic activity while the weight increase of the prostate is taken as an expression of the androgenic activity as determined in castrated male rats of 30–40 g. body weight by the method of Hershberger et al. (Proc. Soc. Exp. Biol. Med., 1953, 83, page 175).

The 3-(N-pyrrolidinyl)-steroids of the invention, are prepared according to the usual procedure described by M. E. Herr et al. (J. Am. Chem. Soc., 1953, 75, page 1918 and page 5927) and by J. L. Johnson et al. (J. Am. Chem. Soc., 1956, 78, page 430). The starting 4-hydroxy-3-keto-Δ⁴-steroid is condensed with pyrrolidine in an aliphatic alcohol with a low number of carbon atoms, such as methanol or ethanol, preferably at the boiling point of the alcohol and under nitrogen. The 3-(N-pyrrolidinyl)-derivatives are isolated from the reaction mixture in known manner, preferably by concentrating the solution in vacuo, crystallizing, and eventually recrystallizing from aliphatic alcohols with a low number of carbon atoms. Yields are practically quantitative.

The three compounds of the invention are white microcrystalline powders and have neither virilizing nor collateral undesirable effects.

Because of their high therapeutic index and the consequent very low androgenic activity, they can be used in therapy especially in pediatry and for women when it is necessary to stimulate the proteinic anabolism, to improve the general condition or to increase the body weight of patients without the known inconvenience of the prolonged administration of anabolic steroids (virilizing and collateral effects).

Their principal applications are particularly internal medicine (leanness, decay, ill-feeding, convalescences, osteoporosis, etc.) pediatry (hypoevolutism, growth delay, prematurity etc.), surgery (healing of traumatic and pathological fractures, collateral therapy of organic neoproductive forms), and gynaecology (hyperovarism, hyperfolliculinism, haemorrhage metropathiea, dysmenorrhoea, endometriosis).

The recommended posology for human beings is 20–40 mg. per day of active product for adults and of 0.1–0.3 mg. per day per kg. of body weight for children.

Pharmaceutical compositions according to the invention comprise one of the compounds of the invention with a significant quantity of a pharmaceutically acceptable vehicle either solid or liquid, elixirs, suspensions, tablets, powders, pills, capsules and other forms suitable for oral administration in dosage unit form, optionally in admixture with another therapeutically active substance. Suitable as vehicles are starch, lactose, talc, stearic acid, magnesium stearate, pectins and others commonly used for those purposes. The compounds of the invention may alternatively be used without a vehicle by putting them in capsules of gelatin or the like.

The percentage of the active ingredient varies according to the particular pharmaceutical form. Generally the compositions of the invention contain at least 1% and preferably from 5 to 50% of active ingredient. The preferred pharmaceutical compositions are tablets containing from 5 to 50 mg. of active ingredient.

The following examples are to illustrate the invention, but not to limit the scope thereof:

Example 1

17α-METHYL-2-ANDROSTENE-3-(N-PYRROLIDINYL)-17β-OL-4-ONE (I)

5 g. 4-hydroxy-17α-methyl-testosterone are dissolved in 200 cc. of methanol and refluxed under nitrogen for 3 hours in the presence of 6 cc. pyrrolidine. The solution is concentrated to a small volume under vacuum. The crystals obtained are filtered, washed with water and dried. The product is recrystallized from methanol.

4.5 g. I melting at 194–196° C. (dec.) are obtained. $[\alpha]_D^{22} = +14° \pm 2°$ (concentration=1% in chloroform) $\lambda_{max.}^{C_2H_5OH}$ at 310 m$\mu$ ($\epsilon$=2410).

Example 2

17α-METHYL-19-NOR-2-ANDROSTENE-3-(N-PYRROLIDINYL)-17β-OL-4-ONE (II)

0.50 g. 4-hydroxy-17α-methyl-19-nor-testosterone are heated under reflux for 2 hours under nitrogen with 0.7 cc. pyrrolidine in 20 cc. methanol. The solution is concentrated to a small volume in vacuo. The crystallized product is filtered, washed with water and dried. The product is recrystallized from ethanol.

440 mg. II melting at 158–160° C. (dec.) are obtained. $[\alpha]_D^{22} = +59°$ (concentration=1% in chloroform) $\lambda_{max.}^{C_2H_5OH}$ at 218 m$\mu$ ($\epsilon$=4450) and at 314 m$\mu$ ($\epsilon$=2200).

Example 3

17α-METHYL-19-3-NOR-(N-PYRROLIDINYL)-3,5-ANDROSTADIENE-17β-OL (III)

5 g. 17α-methyl-19-nor-testosterone are dissolved in 2.5 cc. methanol and refluxed under nitrogen, 0.2 cc. of pyrrolidine are added and the whole is refluxed for 2 minutes always under nitrogen. The solution is cooled and the nitrogen stream is cut off. By rubbing, the product crystallizes in the form of needles. It is filtered and washed first with methanol and then with water. It is dried under vacuum at room temperature.

The pure product has the following physico-chemical properties: It melts at 83–88° C., solidifies and remelts at 140–145° C. $[\alpha]_D^{22} = -205° \pm 2°$ (concentration=1% in dioxane) $\lambda_{max.}^{ethanol\ 95\%}$ at 278 m$\mu$ ($\epsilon$=18,500)

We claim:

1. A steroid having a formula selected from the group consisting of

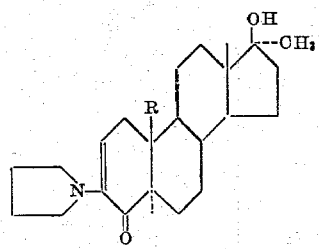

and

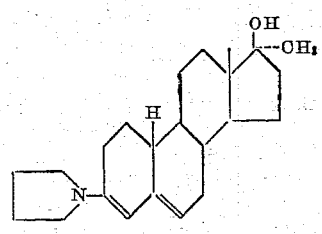

wherein R is selected from the group consisting of H and CH$_3$.

2. 17α-methyl-2-androstene - 3 - (N-pyrrolidinyl)-17β-ol-4-one.

3. 17α-methyl-19 - nor - 2 - androstene - 3 - (N-pyrrolidinyl)-17β-ol-4-one.

4. 17α-methyl-19-nor - 3 - (N-pyrrolidinyl)-3,5-androstadiene-17β-ol.

5. Pharmaceutical compositions being useful in the therapy as anabolizing agents and suitable for oral administration, characterized in that they contain as an active ingredient a steroid having a formula selected from the group consisting of

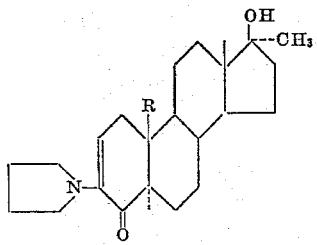

and

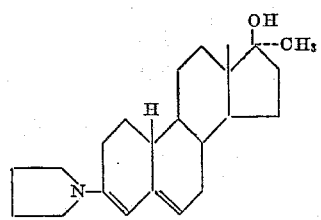

wherein R is selected from the group consisting of H and CH$_3$.

6. The process of preparing steroids which have the following general formula

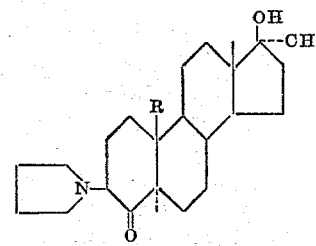

wherein R is selected from the group consisting of H and CH$_3$, in which the starting 4-hydroxy-3-keto-Δ$^4$-steroid, respectively the 4-hydroxy-17α-methyl-testosterone and the 4-hydroxy-17α-methyl - 19 - nor - testosterone, is condensed with pyrrolidine in a lower aliphatic alcohol at boiling temperature of said alcohol and in a nitrogen atmosphere, and the resulting 3-(N-pyrrolidinyl)-steroids, respectively the 17α-methyl-2-androstene - 3 - (N-pyrrolidinyl)-17β-ol-4-one and the 17α-methyl-19-nor-2-androstene-3-(N-pyrrolidinyl)-17β-ol-4-one, are isolated from the reaction mixture.

References Cited in the file of this patent

UNITED STATES PATENTS 2,781,342  Herr et al. _____ Feb. 12, 1957